United States Patent
Attar et al.

(10) Patent No.: US 9,866,401 B2
(45) Date of Patent: Jan. 9, 2018

(54) DYNAMIC PROTECTION OF SHARED MEMORY AND PACKET DESCRIPTORS USED BY OUTPUT QUEUES IN A NETWORK DEVICE

(71) Applicant: Cisco Technology, Inc., San Jose, CA (US)

(72) Inventors: Mohammadreza Alizadeh Attar, Santa Clara, CA (US); Sha Ma, San Jose, CA (US); Vinod Mitulal, San Jose, CA (US); Krishnan Subramani, San Jose, CA (US); Georges Akis, Los Altos, CA (US); Peter Newman, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 192 days.

(21) Appl. No.: 14/710,974

(22) Filed: May 13, 2015

(65) Prior Publication Data

US 2016/0337142 A1 Nov. 17, 2016

(51) Int. Cl.
*H04L 12/18* (2006.01)
*H04L 12/861* (2013.01)
(Continued)

(52) U.S. Cl.
CPC ...... *H04L 12/1881* (2013.01); *H04L 47/6255* (2013.01); *H04L 47/6275* (2013.01); *H04L 49/9047* (2013.01)

(58) Field of Classification Search
None
See application file for complete search history.

(56) References Cited

U.S. PATENT DOCUMENTS

| 5,541,912 A | 7/1996 | Choudhury et al. |
| 6,388,993 B1 * | 5/2002 | Shin ............... H04L 12/5693 370/233 |

(Continued)

OTHER PUBLICATIONS

International Search Report and Written Opinion in counterpart International Application No. PCT/US2016/031787, dated Aug. 12, 2016, 10 pages.

(Continued)

*Primary Examiner* — Jeffrey M Rutkowski
*Assistant Examiner* — Jonathan B Wood
(74) *Attorney, Agent, or Firm* — Edell, Shapiro & Finnan, LLC

(57) ABSTRACT

A network switch includes a buffer to store network packets and packet descriptors (PDs) used to link the packets into queues for output ports. The buffer and PDs are shared among the multiple traffic pools. The switch receives a multicast packet for queues in a given pool. The switch determines if there is unused buffer space available for packets in the given pool based on a pool dynamic threshold, if there is unused buffer space available for packets in each queue based on a queue dynamic threshold for the queue, if there are unused PDs available to the given pool based on a pool dynamic threshold for PDs, and if there are unused PDs available for each queue based on a queue dynamic threshold for PDs for the queue. The network switch admits the packet only into the queues for which all of the determining operations pass.

20 Claims, 8 Drawing Sheets

(51) Int. Cl.
*H04L 12/863* (2013.01)
*H04L 12/885* (2013.01)
*H04L 12/865* (2013.01)

(56) References Cited

U.S. PATENT DOCUMENTS

| | | | |
|---|---|---|---|
| 6,556,578 B1 | 4/2003 | Silberschatz et al. | |
| 6,657,955 B1* | 12/2003 | Bonneau | H04L 12/5602 370/229 |
| 6,671,258 B1 | 12/2003 | Bonneau | |
| 6,675,220 B1 | 1/2004 | Bergamasco et al. | |
| 6,829,649 B1 | 12/2004 | Shorey et al. | |
| 6,842,423 B1 | 1/2005 | Erimli et al. | |
| 6,870,812 B1 | 3/2005 | Kloth et al. | |
| 7,027,457 B1 | 4/2006 | Chiussi et al. | |
| 7,245,586 B2 | 7/2007 | Bitar et al. | |
| 7,411,957 B2* | 8/2008 | Stacy | H04L 47/32 370/392 |
| 7,426,575 B1* | 9/2008 | Reissfelder | H04L 47/10 709/231 |
| 7,539,142 B1* | 5/2009 | Gurley | H04L 12/4625 370/235 |
| 8,248,945 B1* | 8/2012 | Sathe | H04L 47/13 370/235 |
| 8,782,307 B1 | 7/2014 | White et al. | |
| 8,897,315 B1* | 11/2014 | Arad | H04L 49/252 370/428 |
| 2003/0007452 A1* | 1/2003 | Gorti | H04L 47/10 370/229 |
| 2003/0026205 A1* | 2/2003 | Mullendore | H04L 12/5693 370/230 |
| 2003/0058852 A1* | 3/2003 | Luhmann | H04L 12/5693 370/389 |
| 2004/0003069 A1 | 1/2004 | Wong | |
| 2004/0090974 A1 | 5/2004 | Balakrishnan et al. | |
| 2004/0260829 A1* | 12/2004 | Husak | H04L 47/15 709/232 |
| 2006/0092833 A1 | 5/2006 | Bemmel et al. | |
| 2006/0164989 A1 | 7/2006 | Hart et al. | |
| 2006/0176893 A1* | 8/2006 | Ku | H04L 49/3027 370/412 |
| 2007/0153803 A1 | 7/2007 | Lakshmanamurthy et al. | |
| 2007/0206602 A1 | 9/2007 | Halabi et al. | |
| 2007/0237074 A1* | 10/2007 | Curry | H04L 47/10 370/229 |
| 2009/0034549 A1* | 2/2009 | Soni | H04L 12/5693 370/412 |
| 2010/0054126 A1 | 3/2010 | Kwan et al. | |
| 2011/0142064 A1 | 6/2011 | Dubai et al. | |
| 2011/0235509 A1 | 9/2011 | Szymanski | |
| 2013/0250757 A1* | 9/2013 | Tabatabaee | H04L 47/266 370/230 |
| 2015/0016266 A1* | 1/2015 | Dumitrescu | H04L 47/623 370/236 |
| 2015/0180769 A1 | 6/2015 | Wang et al. | |
| 2015/0195183 A1* | 7/2015 | Park | H04L 41/0816 709/242 |
| 2015/0296528 A1 | 10/2015 | Coffey et al. | |
| 2016/0099881 A1* | 4/2016 | Swartzentruber | H04L 49/9084 370/235 |
| 2016/0142333 A1 | 5/2016 | Panchagnula et al. | |
| 2016/0294696 A1 | 10/2016 | Gafni et al. | |
| 2016/0337142 A1 | 11/2016 | Attar et al. | |

OTHER PUBLICATIONS

Choudhury, et al., "Dynamic Queue Length Thresholds in a Shared memory ATM Switch", INFOCOM '96, Fifteenth Annual Joint Conference of the IEEE Computer Societies, Networking the Next Generation, Proceedings IEEE, Mar. 24-28, 1996, DOI: 10.1109/INFCOM.1996.493364, 9 pages.

* cited by examiner

DYNAMIC PROTECTION OF SHARED MEMORY AND PACKET DESCRIPTORS USED BY OUTPUT QUEUES IN A NETWORK DEVICE

TECHNICAL FIELD

The present disclosure relates generally to sharing resources used by output queues in a network device.

BACKGROUND

A network switch stores incoming network packets in a buffer memory and directs the stored packets to various output queues that share the buffer memory in the switch. The network switch preferably prevents any single output queue from taking more than its fair share of the shared buffer memory when the buffer is oversubscribed, but permits a single queue to take more than its fair share to handle incoming bursts if the buffer is not oversubscribed. Conventional buffer sharing techniques are overly simplistic in that they do not account for the fact that network packets may fall into multiple different traffic classes, such as voice, video, and data that may have different priorities and buffer storage needs. Also, the conventional buffer sharing techniques only apply to unicast traffic and thus ignore complications that arise from multicast traffic.

DESCRIPTION OF EXAMPLE EMBODIMENTS

Overview

A network switch includes a buffer having buffer space to store network packets, and a store of packet descriptors (PDs) that are used to link the network packets into queues that feed the packets to output ports of the switch. The buffer space is shared among multiple traffic pools and the PDs are shared among the multiple traffic pools. The network switch receives a multicast packet destined for multiple queues associated with a given pool. The network switch determines: if there is unused buffer space available for packets in the given pool based on a pool dynamic threshold; for each queue, if there is unused buffer space available for packets in that queue based on a queue dynamic threshold for that queue; if there are unused PDs available to the given pool based on a pool dynamic threshold for PDs; for each queue, if there are unused PDs available for that queue based on a queue dynamic threshold for PDs for that queue. The network switch admits the packet only into the queues for which all of the determining operations pass.

Example Embodiments

Figure 1:
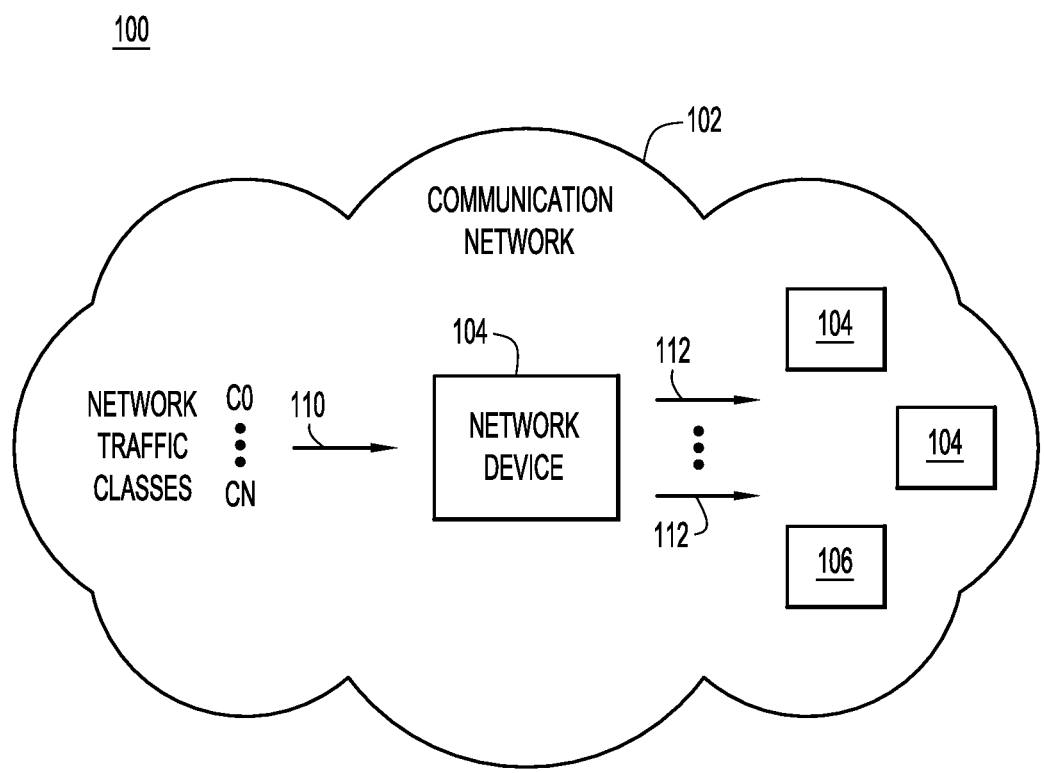
FIG. 1 is a block diagram of an example network environment in which embodiments directed to dynamic protection of resources shared by output queues in a network device may be implemented, according to an example embodiment.

Referring first to FIG. 1, a block diagram of an example network environment 100 in which embodiments directed to dynamic protection of resources shared by output queues in a network device may be implemented. Network environment 100 includes a communication network 102 that may encompass one or more wide area networks (WANs), such as the Internet, and one or more local area networks (LANs). Network 102 also includes multiple network devices 104 (each of which may be referred to as a network device 104), such as network switches and/or network routers, and one or more client devices 106, for example. Each network device 104 receives network traffic 110 in the form of network packets, e.g., Internet Protocol (IP) packets, from network 102 and switches/routes the received network traffic to various destinations in the network as output traffic/packets 112. Network traffic 110/112 may include IP packets categorized across a variety of different traffic classes of network traffic. The different classes may differentiate between different types of network traffic on the basis of priority/Quality-of-Service (QoS). The different classes may be applied to network traffic occurring in a variety of forms, such as, but not limited to, voice, video, data, email, and so on. The traffic classes used herein may include traffic classes based on class of service priorities defined in IEEE 802.1Q, for example, although other traffic classes may be used. The IP packets may include unicast IP packets each to be switched/routed to one destination, and multicast IP packets each to be switched/routed to multiple destinations.

As will be described more fully below, network device 104 stores received packets in a packet buffer (not shown in FIG. 1), and directs the stored packets from the packet buffer to various output queues (also not shown in FIG. 1) that feed the various destinations in the network. Network device 104 may link the packets in the packet buffer to the output queues using packet descriptors. The packet buffer and packet descriptors represent limited or finite resources that are shared across the output queues. The packet buffer and packet descriptors are capable of being exhausted under heavy traffic conditions, but may also be under utilized in light traffic conditions. According to embodiments described herein, network device 104 implements dynamic protection of the shared packet buffer and packet descriptors using dynamic thresholds that account for the different network classes into which packets may fall and whether the packets are unicast or multicast packets.

Figure 2:
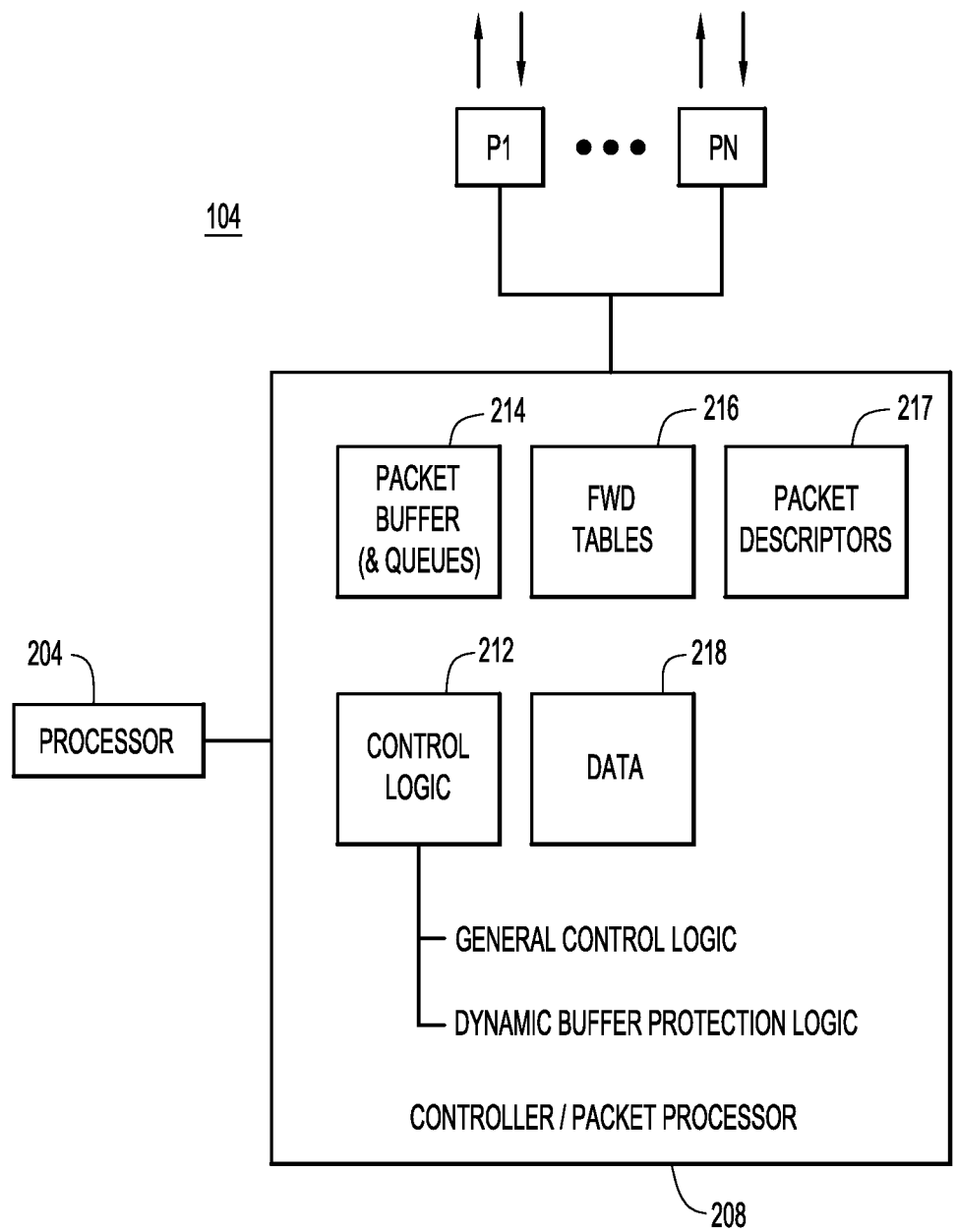
FIG. 2 is a block diagram of a network device, such as a network switch or router, configured to perform operations related to the dynamic protection of resources shared by output queues in the network device, according to an example embodiment.

With reference to FIG. 2, there is shown an example block diagram of network device 104, e.g., a network switch or router, configured to perform operations to implement dynamic buffer protection as described herein. The term "network switch" as used herein is construed broadly to mean both a network switch and a network router. There are numerous possible configurations for network device 104 and FIG. 2 is meant to be an example. Network device 104 includes multiple physical network ports P1-PN coupled to a controller or packet processor 208. Network ports P1-PN may include, for example, Ethernet ports and/or wireless ports to allow network device 104 to communicate over various network connections. Controller/packet processor 208 may be implemented in an Application Specific Integrated Circuit (ASIC), for example, configured to perform packet processing as described herein.

Figure 5:
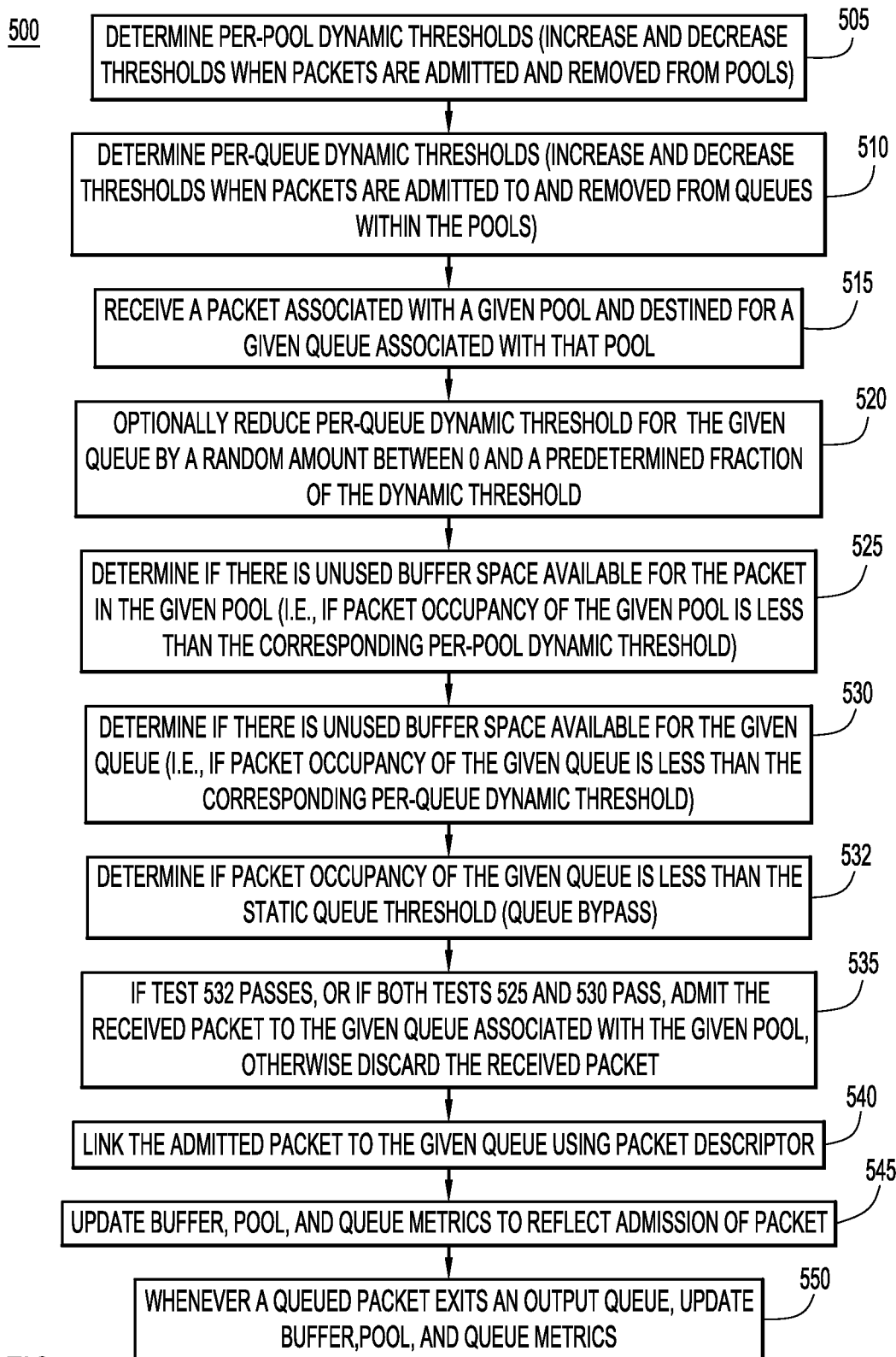
FIG. 5 is a flowchart of a method of dynamic protection of resources performed with the packet flow arrangement of FIG. 4, according to the first embodiment.
Figure 7A:
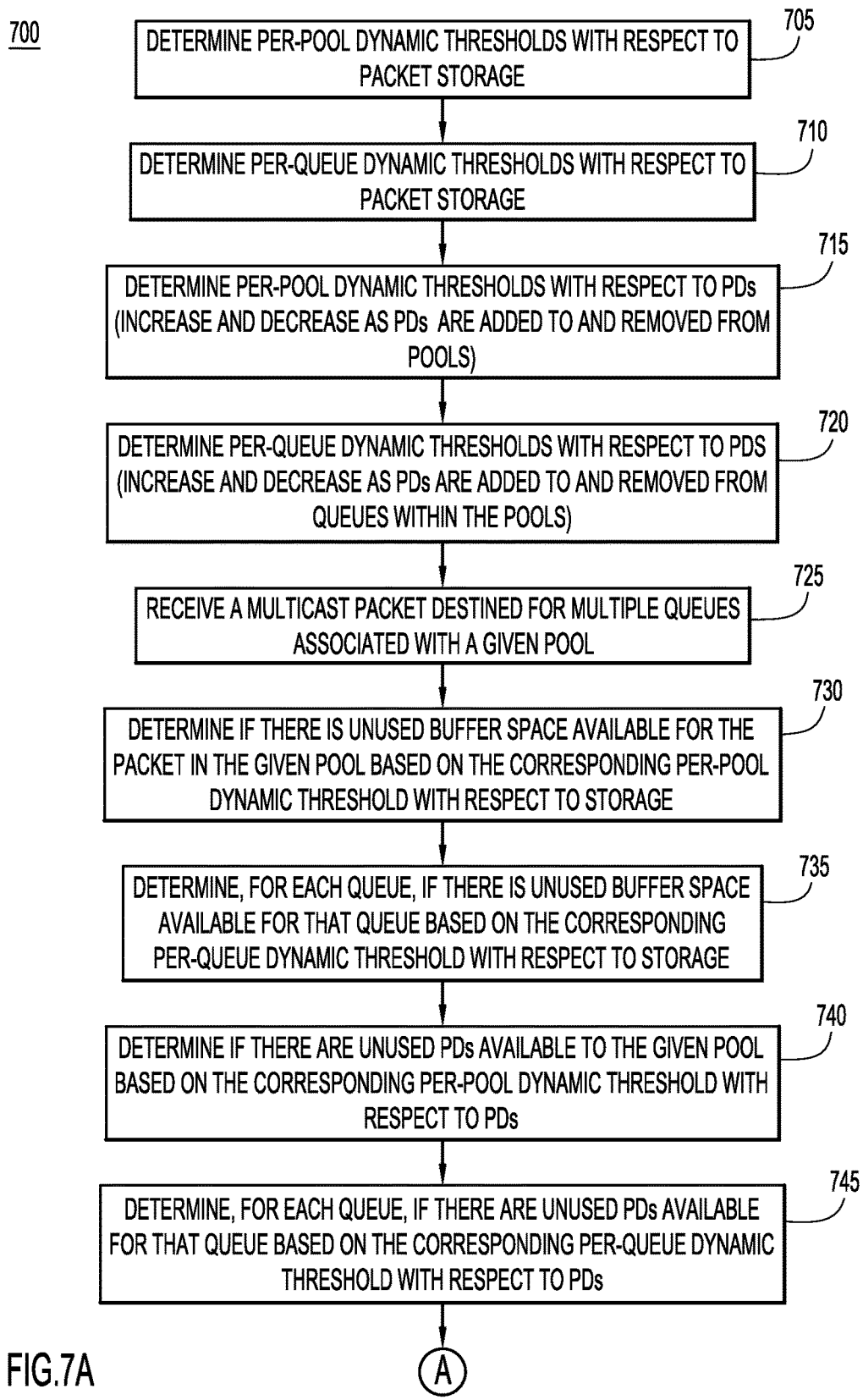
FIGS. 7A and 7B are a flowchart of a method of dynamic protection of resources performed with the packet flow arrangement of FIG. 6, according to the second embodiment.
Figure 7B:
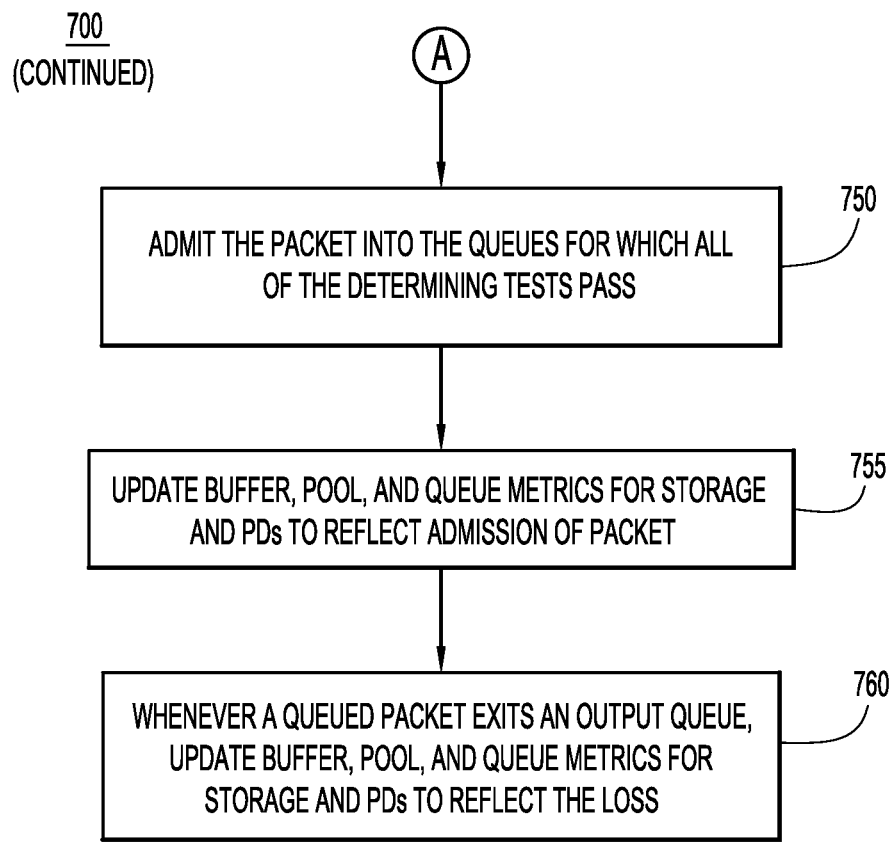

Controller 208 includes Control logic 212/control circuitry 212 having General Control logic to control network device 104 and perform packet switching, generally, and also Dynamic Buffer Protection logic to implement dynamic buffer and packet descriptor protection operations described herein, for example, in connection with FIGS. 5, and 7A and 7B. Controller 208 also includes random access memory (RAM) for a buffer 214 to store packets received via ports P1-PN and input and output queues linked to the stored packets, forwarding (FWD) tables 216, a store 217 of packet descriptors (PDs), and data 218 generated and used by Control logic 212. Data 218 may include: various computed metrics associated with each of buffer 214, output queues linked to the buffer, and packet descriptors; per-pool and per-queue dynamic thresholds; and alpha parameters (all described below). Controller 208 may also include nonvolatile memory (not shown) for storing various static/predetermined parameters used by the controller, or these may be obtained from an external source such as a management processor (not shown) during initialization.

In another embodiment, Control logic 212 may include a processor (not shown), such as a microcontroller, and a memory that comprises computer readable storage media encoded with software comprising computer executable instructions that when executed (by the processor) cause the processor to perform the operations described herein.

In operation, network device 104 receives network packets at input ports among network ports P1-PN and switches/routes the packets to output ports among the network ports based on information stored in forwarding tables 216. To assist with such switching operation, network device stores the received network packets in buffer 214 and uses packet descriptors from packet descriptor store 217 to link the packets to output queues that feed respective ones of the output ports. Control logic 212 uses dynamic protection operations to manage the manner in which the packets are admitted into buffer 214 and the output queues, and the manner in which the packet descriptors are used, as will be described in detail below.

As mentioned above, network traffic 110 received at network device 104 may include IP packets that fall into a variety of different network traffic classes aligned with different levels of QoS/priority. In addition, network traffic 110 may be either unicast traffic in which each received IP packet is destined for one output port Pi, or multicast traffic in which each received IP packet is copied or fanned-out to multiple ones of output ports P1-PN. At a high-level, network device 104 implements or uses traffic "pools" to handle unicast and multicast network traffic in combination with the variety of different network traffic classes, as is described in connection with FIG. 3.

Figure 3:
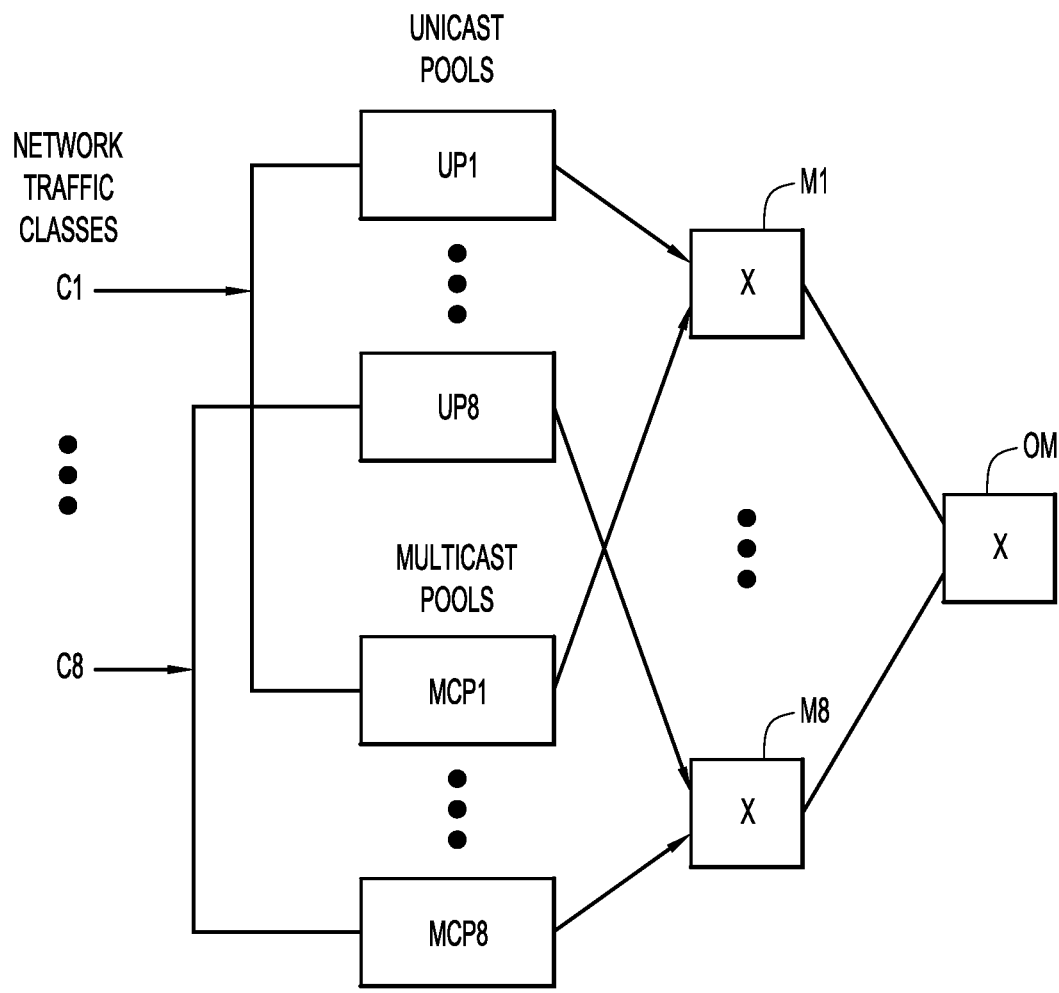
FIG. 3 is a network traffic handling architecture implemented in the network device that uses "pools" to handle unicast and multicast network traffic in combination with different network traffic classes, according to an example embodiment.

With reference to FIG. 3, there is shown an example network traffic handling architecture 300 implemented in network device 104 that uses "pools" to handle unicast and multicast network traffic in combination with different network traffic classes. The example of FIG. 3 assumes that network traffic may be categorized into multiple network classes C1-C8. Accordingly, architecture 300 dynamically divides network device resources, such as buffer 214, among multiple unicast pools UP1-UP8 and multiple multicast (mcast) pools MCP1-MCP8, although more or less pools may be used to handle more or less network traffic classes. Unicast network traffic (e.g., unicast IP packets) categorized in network classes C1-C8 uses unicast pools UP1-UP8, respectively, while multicast network traffic (e.g., mcast IP packets) categorized in network classes C1-C8 use multicast pools MC1-MC8, respectively. In this example, a pool is a set of resources, such as space in buffer 214 and other resources described below, allocated to a corresponding network traffic class, except that each network traffic class is allocated among both a unicast pool and an mcast pool. Architecture 300 includes $1^{st}$ stage traffic mixers M1-M8, each mixer Mi to mix unicast traffic stored in unicast pool UPi with mcast traffic stored in corresponding mcast pool MCPi, and provide a mixed output to a $2^{nd}$ stage or output traffic mixer OM, which outputs the traffic to output ports for which the various traffic flows are destined. In another embodiment, $1^{st}$ stage traffic mixers M1-M8 are omitted, and all of unicast pools UP1-UP8 and all of multicast pools MCP1-MCP8 are separately selected for output by output traffic mixer OM.

Figure 4:
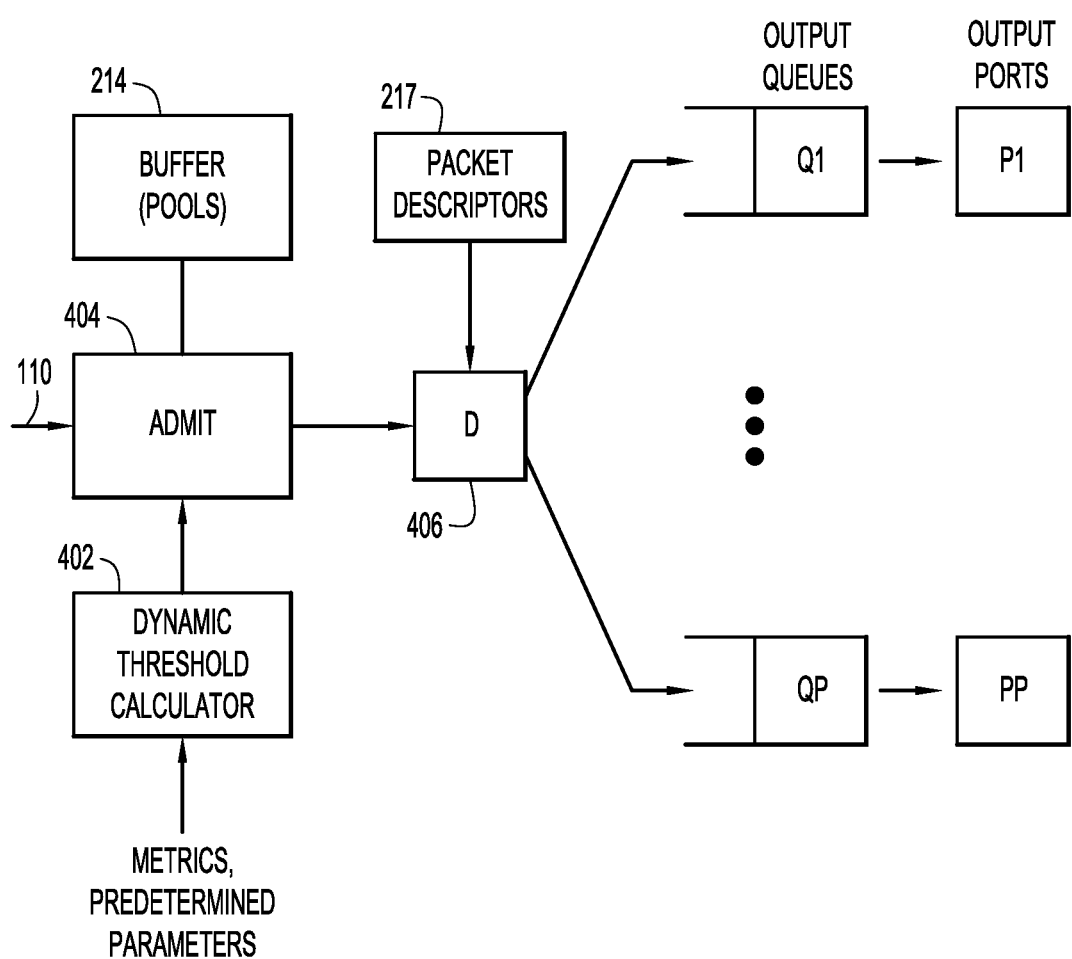
FIG. 4 is an illustration of a packet flow arrangement of the network device used to implement dynamic protection of resources according to a first embodiment.

With reference to FIG. 4, there is an illustration of a packet flow arrangement 400 of network device 104 used to implement dynamic buffer protection according to a first embodiment. The first embodiment implements dynamic protection of buffer 214 in network device 104 and may be used to handle unicast traffic, for example. Packet flow arrangement 400 includes: a dynamic threshold calculator 402 to determine/compute per-pool and per-queue dynamic thresholds based on buffer and queue metrics; an admit block 404 to determine whether to admit received network packets 110 based on the per-pool and per-queue dynamic thresholds; network packet output queues Q1-QP (where P is less than or equal to N, from FIG. 2) that each hold links to admitted network packets, and that feed the packets linked thereto (i.e., queued therein) to one or more output ports among network ports P1-PP associated with the output queues; a packet director 406 to direct and link admitted packets to appropriate ones of the output queues; and store 217 of packet descriptors used to link the packets into the output queues. Although only one set of output queues is shown in FIG. 4, it should be understood that, at any given time, each pool (concurrent with all of the other pools into which buffer 214 is dynamically divided) may have or be associated with its own set of up to N (active) output queues because there are N network ports for network switch 104 and each pool may access all of the N network ports.

In example of packet flow arrangement 400, each output queue Qi may be a singly linked list of packet descriptors taken from packet descriptor store 217, where each packet descriptor includes a first pointer that points to a corresponding packet stored in a pool (e.g., UPi) of buffer 214 and a second pointer that points to a next packet descriptor in output queue Qi, respectively. To queue/link a packet already stored in buffer 214 into output queue Qi, packet director 406 accesses a free (unused) packet descriptor in packet descriptor store 217, sets the first pointer of the packet descriptor to an address of the packet in the buffer 214, and sets the second pointer of the last packet descriptor previously linked to the output queue to the packet descriptor just accessed. Thus, when the packet descriptors linked into output queue Qi are sequentially traversed, the packets linked to those packet descriptors are sequentially accessed and fed to the output port associated with the output queue. The operation of packet flow arrangement of FIG. 4 is described below in connection with FIG. 5.

With reference to FIG. 5, there is a flowchart of an example method 500 of dynamic protection of buffer resources implemented by the packet flow arrangement of FIG. 4. Method 500 assumes steady-state conditions in which network packets have been received, admitted, and output by network device 104 over a span of time.

Method 500 maintains/tracks various buffer and queue related metrics and has access to various predetermined alpha parameters used collectively by the operations of the method. For example, method 500 maintains/tracks the following metrics (a)-(d):

a. A total amount of unused buffer space in buffer 214 available to store packets for all of the pools (also referred to as "global free" buffer space). The global free buffer space may be indicated by a free list indicator of unused buffer space. The free list is decreased by an amount of buffer space a packet consumes when the packet is admitted (and stored in the buffer), and increased by the same amount when the packet exits an output queue in which the packet was queued. The global free buffer space ranges from a maximum amount of unused buffer space to be shared among the pools when there are no packets stored therein to a minimum amount of unused buffer space (e.g., zero) when packets completely fill the buffer space.

b. An amount of buffer space (actually) used by each output queue associated with each pool, i.e., a measure of output queue length or the amount of queued packets in each output queue. The amount of buffer space used by each output queue is also referred to as "packet occupancy of the queue" or more simply as "queue occupancy."

c. An amount of buffer space (actually) used for each pool (also referred to as "packet occupancy of the pool" or more simply as "pool occupancy"). The amount of buffer space used for a given pool is a sum of the buffer space used by the packets in all of the output queues for that pool (i.e., the sum of all queue occupancies for a given pool).

d. An amount of unused buffer space available to store packets in each pool=per-pool dynamic threshold–amount of buffer space used for the corresponding pool. The aforementioned per-pool dynamic threshold is determined in operation 505 (described below).

In addition to the above dynamic metrics, method 500 has access to a static queue threshold or "queue minimum" stored by controller 208 that the method uses for "queue bypass," described below. The static queue threshold represents an amount of buffer space that would be consumed by a small number of packets, e.g., 10 packets, although other thresholds may be used.

At 505, dynamic threshold calculator 406 determines/computes a per-pool dynamic threshold for each pool as:

Per-pool dynamic threshold=per-pool parameter*global free buffer space.

A given per-pool dynamic threshold defines an upper limit for pool occupancy, where the upper limit is based on the amount of unused buffer space available for all of the pools (the global free buffer space). More specifically, the per-pool dynamic threshold is proportional to the global free buffer space. The per-pool parameter is a predetermined parameter and may be different for each pool. The per-pool parameters may be set to different values to account for different priorities of classes corresponding to the pools. Higher priority pools (classes) may be given higher valued per-pool parameters, which results in a higher fraction of the global free buffer space being made available to the higher priority pools. The per-pool dynamic thresholds are dynamic because over time they increase and decrease as packets are admitted to and removed from the pools (due to the impact of these actions on the global free buffer space).

At 510, dynamic threshold calculator 402 determines/computes a per-queue dynamic threshold for each output queue in each pool as:

Per-queue dynamic threshold=per-queue parameter*amount of unused buffer space in the pool associated with the queue.

The per-queue dynamic threshold defines an upper limit for queue occupancy based on an amount of unused buffer space available in the pool with which the output queue is associated. More specifically, the per-queue dynamic threshold for an output queue is proportional to the amount of unused buffer space in the pool associated with that output queue. There is a distinct per-queue dynamic threshold for each output queue in each pool; however, in one embodiment, the per-queue parameter may be the same across all output queues and all pools. The per-queue dynamic thresholds are dynamic because over time they increase and decrease as packets are added to and removed from the output queues within the pools, which affects the amount of unused buffer space in the pools associated with the output queues.

Note that in the equation for the per-queue dynamic threshold, the amount of unused buffer space in the pool associated with the output queue is given by: the corresponding per-pool dynamic threshold (from 505)–amount of buffer space used for the corresponding pool (i.e., pool occupancy, which is a tracked metric).

The per-pool and per-queue parameters used in the equations above are referred to as alpha ($\alpha$) parameters. Each alpha parameter may have a typical value that falls in the range of $\alpha$=0.5-2, although other values outside of that range may be used.

At 515, admit block 404 receives a packet associated with a given pool and destined for a given output queue associated with that pool. Admit block 404 identifies (i) the associated or given pool based on the class of network traffic into which the packet falls, and (ii) the given output queue based on the output port for which the packet is destined.

In an optional operation 520, admit block 404 or, alternatively, dynamic threshold calculator 402, reduces the per-queue dynamic threshold for the given output queue by a random amount between 0 and a predetermined fraction of the per-queue dynamic threshold. Operation 520 is an optional operation that may be used to help improve "input fairness." Assume, for example, that all of the packets received across a number of input ports of network device 104 are received at the same rate, are all sent to a single output queue (and thus output port), and are overloading that output queue. It is desirable to encourage approximately fair access to the congested output queue by all of the input ports. If all of the input ports are synchronized, all of the output bandwidth (queuing in the output queue) is likely to be consumed by a single one of the input ports that dominates the other input ports. In other words, the same input port will insert packets onto the one output queue every time. Adding random noise to the per-queue dynamic threshold (e.g., reducing the threshold by a random amount for each packet) has the effect on randomizing which input port gets to insert packets onto the output queue so that one given input port does not dominate the output queue. At 520, at each packet arrival, the per-queue dynamic threshold (which defines the maximum queue length) is reduced by a uniform random amount from 0 to a configurable maximum, e.g., 20%. (This is equivalent to applying a drop probability to the top 20% of the output queue with the drop probability being 0 at an output queue length of 80% and increasing linearly to a drop probability of 100% at the dynamic maximum queue threshold.)

At 525, admit block 404 determines if there is unused buffer space available for the packet in the given pool based on the corresponding per-pool dynamic threshold, e.g., if packet occupancy of the given pool is less than the corresponding per-pool dynamic threshold.

At 530, admit block 404 determines if there is unused buffer space available for the given output queue associated with the given pool based on the corresponding per-queue dynamic threshold, e.g., if packet occupancy of the given output queue is less than the corresponding per-queue dynamic threshold.

At 532, admit block 404 determines if the packet occupancy of the given output queue is less than the static queue threshold. This is a "queue bypass" test.

At 535, if the queue bypass test at 532 passes, or if the tests at 525 and 530 both pass, admit block 404 admits the received packet. Admit block 404 stores the packet in the given pool in buffer 214. On the other hand, if the queue bypass test fails and either of the tests at 525 and 530 also fail (i.e., both of the tests 525 and 530 do not pass), admit block 404 discards the packet. The test at 532 is referred to as the "queue bypass" test because, if successful, it bypasses the effect of tests 525 and 530 with respect to packet admission.

In another embodiment, the queue bypass test is omitted and admission depends only on tests 525 and 530. In this embodiment, if the tests at 525 and 530 both pass, admit block 404 admits the received packet. If both of the tests at 525 and 530 do not pass (i.e., either test fails), admit block 404 discards the packet.

At 540, assuming the packet is admitted, director 406 directs and links the admitted packet to the given output queue as described above in connection with FIG. 4 (e.g., by linking a packet descriptor into the given output queue) so that the packet will be fed, in turn, to the output port associated with (i.e., fed by) the given output queue.

At 545, assuming the packet is admitted, the metrics (a)-(d) are updated as appropriate to reflect that the packet has been added to the given pool and the given output queue in that pool, thus increasing corresponding pool and queue occupancy and reducing the unused pool and global free space.

At 550, in a background operation, each time a packet exits an output queue (i.e., is removed or dequeued from the output queue), the packet is also removed or marked as having been removed from its pool in buffer 214. Accordingly, metrics (a)-(d) are updated as appropriate to reflect that the packet has been removed from its output queue and pool, thus decreasing corresponding pool and queue occupancy and increasing the unused pool.

Method 500 is repeated over time as packets are received at network device 104 and output from the output queues, which causes the per-pool and per-queue dynamic thresholds to vary over time. In a given or "current" iteration of method 500, the various variable/dynamic parameters described above (e.g., the global free buffer space, the amounts of unused buffer space available in the various pools, and so on) may be referred to as the "current" parameters used for that iteration (e.g., the "current" global free buffer space, the "current" amounts of unused buffer space available to the various pools, and so on).

It is to be understood that randomizing operation 520 described above may be performed in embodiments either with or without the use of buffer sharing among pools. For example, operation 520 may be performed in a network device that includes a buffer having buffer space to store network packets linked to queues to feed the packets to output ports of the switch associated with the queues, where the buffer space is shared dynamically among the queues, but without the use of pools. In such an embodiment, network device 104 determines for each queue a first dynamic threshold defining an upper limit for queue occupancy of the queue by multiplying an amount of unused buffer space available to store packets by a respective queue parameter for the queue, as described for example in connection with operation 510. Then, when network device 104 receives a packet destined for a given queue, the network device reduces the first dynamic threshold for the given queue by a random amount to produce a second dynamic threshold for the given queue, as described for example in connection with operation 520. Then, network device 104 admits the received packet into the given queue if queue occupancy of the given queue is less than the second/randomly reduced dynamic threshold, and may otherwise drop the received packet (if the queue occupancy is not less than the second dynamic threshold).

Figure 6:
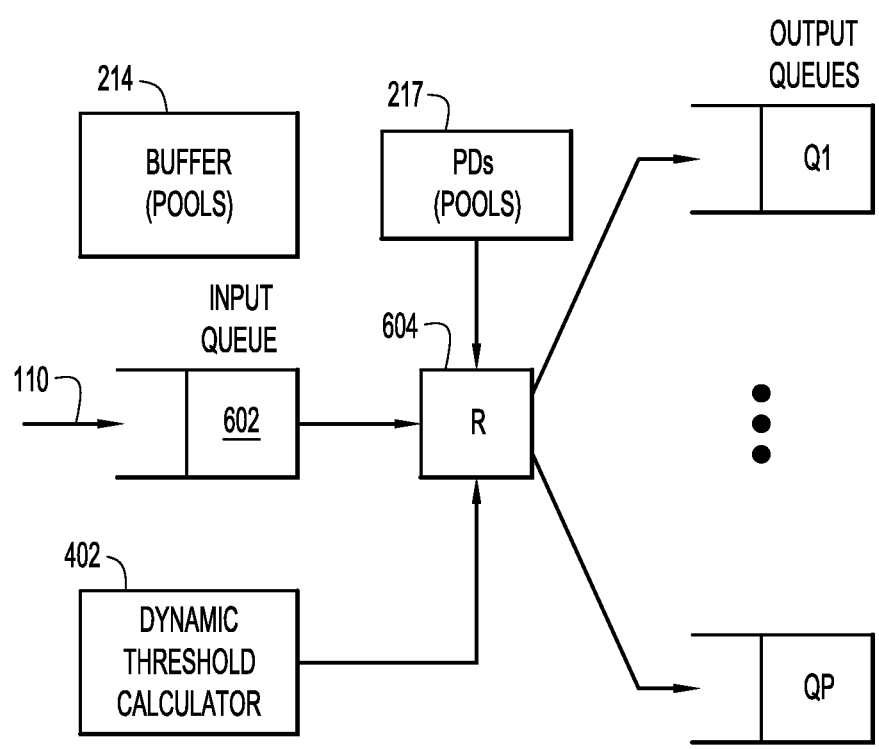
FIG. 6 is an illustration of a packet flow arrangement of the network device used to implement dynamic protection of resources according to a second embodiment.

With reference to FIG. 6, there is an illustration of a packet flow arrangement 600 of network device 104 used to implement dynamic buffer protection according to a second embodiment. The second embodiment implements dynamic protection of buffer and packet descriptor resources in network device 104 and may be used to handle multicast traffic, for example. Packet flow arrangement 600 is similar to packet flow arrangement 400, except that packet flow arrangement 600 includes: an input buffer 602 to receive references/pointers to multicast packets 110 that were stored in buffer 214 when the multicast packets arrived at input ports of network device 104 (prior to when a decision has been made as to whether the packets are to be admitted to output queues for which the packets are destined); and a replicator 604 to perform packet admission decisions on the multicast packets stored in the input buffer, and replicate an admitted multicast packet across multiple output queues associated with output ports for which the multicast packet is destined. Like the buffer space in buffer 214, the packet descriptors of packet descriptor store 217 are dynamically shared among/by all of the pools of buffer 214. The operation of the packet flow arrangement of FIG. 6 is described below in connection with FIGS. 7A and 7B.

With reference to FIGS. 7A and 7B, there is a flowchart of an example method 700 of dynamic protection of buffer and packet descriptor resources implemented by the packet flow arrangement of FIG. 6. Method 700 assumes steady-state conditions in which multicast network packets have been received, admitted (or dropped), and, if admitted, output by network device 104 over a span of time. Method 700 maintains/tracks pool and queue metrics (a)-(d) as mentioned above, but also maintains/tracks additional metrics (e)-(h) associated with packet descriptors, including:

e. A total number of unused packet descriptors available to all of the pools (also referred to as "global free" packet descriptors). The global free packet descriptors may be indicated by a free list indicator of unused packet descriptors. The free list of packet descriptors is decreased when a packet is admitted and linked to (i.e., queued in) an output queue using a packet descriptor, and increased when the packet exits an output queue in which the packet was queued so as to release the associated packet descriptor. The global free packet descriptors (number of unused packet descriptors) ranges from a maximum number of unused packet descriptors to be shared among the pools when there are no packet descriptors used in queues to a minimum number of unused packet descriptors (e.g., zero) when all of the packet descriptors that were in packet descriptor store 217 are linked into queues.

f. A number of packet descriptors (actually) used by each output queue associated with each pool.

g. A number of packet descriptors (actually) used for each pool. The number of packet descriptors used for a given pool is a sum of the number of packet descriptors used for all of the output queues for that pool.

h. A number of unused packet descriptors available for each pool=per-pool dynamic threshold for packet descriptors−number of packet descriptors used for the corresponding pool. The per-pool dynamic threshold for packet descriptors is determined in operation 705 (described below).

At 705 (similar to operation 505), dynamic threshold calculator 402 determines per-pool dynamic thresholds with respect to buffer storage in the manner described for operation 505.

At 710 (similar to operation 510), dynamic threshold calculator 402 determines per-queue dynamic thresholds with respect to packet storage in the manner described for operation 510.

At 715, dynamic threshold calculator 402 determines determines/computes a per-pool dynamic threshold for each pool with respect to (i.e., for) packet descriptors (PDs) as:

Per-pool dynamic threshold for packet descriptors=per-pool parameter for packet descriptors*global free packet descriptors.

A given per-pool dynamic threshold for packet descriptors defines a maximum numbers of packet descriptors for the given pool that is based on (e.g., proportional to) the number of unused packet descriptors available to all of the pools (the global free packet descriptors). The per-pool parameter for packet descriptors is a predetermined parameter and may be different for each pool. The per-pool parameters for the per-pool dynamic thresholds for packet descriptors may be set to different values to account for different priorities of classes corresponding to the pools. Higher priority pools (classes) may be given higher valued per-pool parameters, which results in a higher fraction of unused packet descriptors being made available to the higher priority pools. The per-pool dynamic thresholds for packet descriptors are dynamic because over time they increase and decrease as packets are admitted to and removed from the pools and linked to associated output queues in the pools (due to the impact of these actions on the global free packet descriptors).

At 720, dynamic threshold calculator 402 determines/computes a per-queue dynamic threshold for packet descriptors for each output queue in each pool as:

Per-queue dynamic threshold for packet descriptors=per-queue parameter for packet descriptors*number of unused packet descriptors for the pool associated with the output queue.

A given per-queue dynamic thresholds for packet descriptors defines a maximum numbers of packet descriptors for the corresponding output queue based on (e.g., that is proportional to) the number of unused packet descriptors available in the pool with which the output queue is associated. There is a distinct per-queue dynamic threshold for packet descriptors for each output queue in each pool; however, in one embodiment, the per-queue parameter for packet descriptors may be the same across all output queues and all pools. The per-queue dynamic thresholds for packet descriptors are dynamic because over time they increase and decrease as packets (i.e., packet descriptors) are added to and removed from the output queues within the pools, which affects the number of unused packet descriptors in the pools associated with the output queues.

The per-pool and per-queue parameters used to compute the per-pool and per-queue dynamic thresholds for packet descriptors according to operations 715 and 720 are referred to as alpha parameters for the packet descriptor dynamic thresholds, and may have typical values in the range of 0.5-2, although values outside of that range may be used.

At 725, replicator 604 accesses a next multicast packet, using the pointer/reference thereto in input buffer 602 that is destined for multiple output queues associated with a given pool. Replicator 604 identifies the given pool based on the class into which the multicast packet falls and the multiple output queues based on the multiple ports for which the multicast packet is destined.

At 730-745, replicator 604 determines whether to admit the multicast packet into the multiple output queues based on a series or set of tests performed for each of the multiple output queues, as follows.

At 730, replicator 604 determines if there is unused buffer space available for the packet in the given pool based on the corresponding per-pool dynamic threshold with respect to storage computed at 705, e.g., if packet occupancy of the given pool is less than the corresponding per-pool dynamic threshold.

At 735, replicator 604 determines, for each output queue of the multiple output queues, if there is unused buffer space available for that output queue based on the corresponding per-queue dynamic threshold with respect to storage computed at 710, e.g., if packet occupancy of each output queue is less than the corresponding per-queue dynamic threshold.

At 740, replicator 604 determines if there are unused packet descriptors available to the given pool based on the corresponding per-pool dynamic threshold for packet descriptors computed at 715, e.g., if the number of packet descriptors used for the given pool is less than the corresponding per-pool dynamic threshold for packet descriptors.

At 745, replicator 604 determines, for each output queue of the multiple output queues, if there are unused packet descriptors available for that output queue based on the corresponding per-queue dynamic threshold with respect to packet descriptors computed at 720, e.g., if the number of packet descriptors used by the given output queue is less than the corresponding per-queue dynamic threshold for packet descriptors.

At 750, replicator 604 admits the multicast packet only into the ones of the multiple output queues for which all of the determining tests/operations at 730, 735, 740, and 745 pass. Assuming admission to at least one output queue, replicator 604 links the stored packet to each of the output queues for which all of the tests passed using a respective packet descriptor from packet descriptor store 217. On the other hand, if the packet is not admitted to at least one of the multiple output queues, the packet is removed from buffer

214, e.g., by increasing the free list by an amount of buffer space in the buffer that the packet consumed.

At 755, assuming the packet is admitted to at least one output queue, the metrics (a)-(h) are updated as appropriate to reflect that the packet has been added to the given pool and the given output queue(s) in that pool, thus (i) increasing corresponding pool and output queue occupancy, reducing the unused pool and global free space, and (ii) reducing the global free packet descriptors, increasing the number of packet descriptors used by the output queues in the given pool, increasing the number of packet descriptors used for the given pool, and decreasing the number of packet descriptors available to the given pool.

At 760, in a background operation, each time a packet exits an output queue (i.e., is removed or dequeued from the output queue), the metrics (a)-(h) are updated as appropriate to reflect that action, thus (i) decreasing corresponding pool and queue occupancy, increasing the unused pool and global free space, and (ii) increasing the global free packet descriptors, decreasing the number of packet descriptors used by the output queues in the given pool, decreasing the number of packet descriptors used for the given pool, and increasing the number of packet descriptors available to the given pool.

In an embodiment, dynamic threshold calculator 402 may perform multicast fanout compensation for the per-queue dynamic thresholds for packet descriptors computed at 715 and 720. In multicast, replicator 604 stores a single copy of the admitted packet in buffer 214, but links the packet multiple times (which is the fanout of the packet) to the appropriate output queues. This may limit the utilization of buffer 214 in cases where the average fanout is large. For example, in unicast, if 48 output queues are oversubscribed the amount of buffer unused will be ¹⁄₄₉ if the alpha parameter is 1.0. In multicast, if 48 ports are oversubscribed due to multicast flows of fanout 47, half of the buffer will be unused because only one copy of each packet is stored in the buffer but it is linked to 47 output ports (i.e., output queues). This effect can be compensated for by measuring the average fanout of all of the packets in each traffic class (i.e., pool). As mentioned above, the metrics maintained/tracked in method 700 include the number of packet descriptors used/consumed by each pool, and the metrics may be extended to include the number of packets in each pool. Dividing one by the other, i.e., the ratio of (i) the number of packet descriptors used/consumed by each pool, and (ii) the number of packets in each pool, gives the average fanout. To compensate for the average fanout, the per-queue dynamic thresholds for packet descriptors are each multiplied by the average fanout (e.g., the queue dynamic threshold for PDs is proportional to a product of the above-mentioned ratio, the amount of unused buffer space available to the given pool, and a queue parameter). This gives us the same result as used for unicast calculation.

Method 700 is repeated over time as packets are received at network device 104 and output from the output queues, which causes the pool and queue dynamic thresholds, and the pool and queue dynamic thresholds for packet descriptors to vary over time. In a given or "current" iteration of method 700, the various variable/dynamic parameters described above (e.g., the global free buffer space, the amounts of unused buffer space available for the various pools, the number of unused packet descriptors available for all pools, and the number of unused packet descriptors available to a given pool, and so on) may be referred to as the "current" parameters used for that iteration.

In summary, dynamic thresholds include both per-queue dynamic thresholds and per-pool dynamic thresholds to handle multiple traffic classes (corresponding to pools) and multicast traffic. Under-utilization of a packet buffer for multicast traffic is avoided with fanout compensation. Also, input port fairness is enhanced by the addition of noise to the per-queue dynamic thresholds.

In summary, in one form, a method is provided comprising: at a network switch including a buffer having buffer space to store network packets, and a store of packet descriptors (PDs) that are used to link the network packets into queues that feed the packets to output ports of the switch, wherein the buffer space is shared among multiple traffic pools and the PDs are shared among the multiple traffic pools: receiving a multicast packet destined for multiple queues associated with a given pool; determining if there is unused buffer space available for packets in the given pool based on a pool dynamic threshold; determining, for each queue, if there is unused buffer space available for packets in that queue based on a queue dynamic threshold for that queue; determining if there are unused PDs available to the given pool based on a pool dynamic threshold for PDs; determining, for each queue, if there are unused PDs available for that queue based on a queue dynamic threshold for PDs for that queue; and admitting the packet only into the queues for which all of the determining operations pass.

In another form, an apparatus is provided comprising: network ports to receive and send network packets from and to a network; and a controller coupled to the network ports, the controller including a buffer having buffer space to store network packets, and a store of packet descriptors (PDs) that are used to link the network packets into queues that feed the packets to output ports of the switch, wherein the buffer space is shared among multiple traffic pools and the PDs are shared among the multiple traffic pools, the controller configured to: receive a multicast packet destined for multiple queues associated with a given pool; determine if there is unused buffer space available for packets in the given pool based on a pool dynamic threshold; determine, for each queue, if there is unused buffer space available for packets in that queue based on a queue dynamic threshold for that queue; determine if there are unused PDs available to the given pool based on a pool dynamic threshold for PDs; determine, for each queue, if there are unused PDs available for that queue based on a queue dynamic threshold for PDs for that queue; and admit the packet only into the queues for which all of the determining operations pass.

In yet another form, a non-transitory computer readable storage media encoded with instructions is provided. The instructions, when executed by a controller of a network device that includes a buffer having buffer space to store network packets, and a store of packet descriptors (PDs) that are used to link the network packets into queues that feed the packets to output ports of the network device, wherein the buffer space is shared among multiple traffic pools and the PDs are shared among the multiple traffic pools, cause the controller to: receive a multicast packet destined for multiple queues associated with a given pool; determine if there is unused buffer space available for packets in the given pool based on a pool dynamic threshold; determine, for each queue, if there is unused buffer space available for packets in that queue based on a queue dynamic threshold for that queue; determine if there are unused PDs available to the given pool based on a pool dynamic threshold for PDs; determine, for each queue, if there are unused PDs available for that queue based on a queue dynamic threshold for PDs for that queue; and admit the packet only into the queues for which all of the determining operations pass.

In an even further form, a method is provided comprising: in a network switch having a buffer to store network packets, and packet descriptors (PDs) to link the network packets into queues that feed the packets to output ports of the switch associated with the queues, wherein the buffer is shared among multiple traffic pools each associated with a respective one of multiple traffic classes, and the PDs are shared among the pools: receiving a multicast packet destined for multiple queues associated with a given pool; determining if there is unused buffer space available for the packet in the given pool; determining, for each queue, if there is unused buffer space available for that queue; determining if there are unused PDs available to the given pool; determining, for each queue, if there are unused PDs available for that queue; and admitting the packet only into the queues for which all of the determining operations pass. The method may further comprise: determining per-pool dynamic thresholds defining upper limits for pool occupancy each based on a current amount of unused buffer space available to store packets in all of the pools, wherein the determining if there is unused buffer space available for the packet in the given pool includes determining that there is unused buffer space available for the packet in the given pool if occupancy of the given pool is less than the corresponding per-pool dynamic threshold. The method may further comprise: determining per-queue dynamic thresholds defining upper limits for queue occupancy based on current amounts of unused buffer space available in the pools with which the queues are associated, wherein the determining, for each queue, if there is unused buffer space available for the queue includes determining that there is unused buffer space available for the queue if occupancy of the queue is less than the corresponding per-queue dynamic threshold. The method may also further comprise: determining per-pool PD dynamic thresholds defining maximum numbers of PDs for the pools each based on a current number of unused PDs available to all of the pools, wherein the determining if there are unused PDs available to the given pool includes determining that there are unused PDs available to the given pool if a current number of PDs used by the given pool is less than the corresponding per-pool PD dynamic threshold. The method may further comprise: determining per-queue PD dynamic thresholds defining maximum numbers of PDs for the queues based on current numbers of unused PDs available in the pools with which the queues are associated, wherein the determining, for each queue, if there are unused PDs available for the queue includes determining there are unused PDs available for the queue if a current number of PDs used by the queue is less than the corresponding per-queue PD dynamic threshold.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a network switch including a buffer having buffer space to store network packets, and a store of packet descriptors (PDs) that are used to link the network packets into queues that feed the packets to output ports of the switch, wherein the buffer space is shared among multiple traffic pools and the PDs are shared among the multiple traffic pools:
   receiving a multicast packet destined for multiple queues associated with a given pool;
   determining if there is unused buffer space available for packets in the given pool based on a pool dynamic threshold;
   determining, for each queue, if there is unused buffer space available for packets in that queue based on a queue dynamic threshold for that queue;
   determining if there are unused PDs available to the given pool based on a pool dynamic threshold for PDs;
   determining, for each queue, a queue dynamic threshold for PDs so as to define a maximum number of PDs available to the queue that is based on a number of unused PDs available to the given pool, wherein the queue dynamic threshold for PDs is determined based on an average fanout of packets in the given pool, the average fanout being a ratio of (i) a number of PDs used by the given pool, and (ii) a pool occupancy for the given pool;
   determining, for each queue, if there are unused PDs available for that queue based on the queue dynamic threshold for PDs for that queue; and
   admitting the packet only into the queues for which all of the determining operations pass.

2. The method of claim 1, further comprising:
   determining the pool dynamic threshold so as to define an upper limit for pool occupancy for the given pool that is based on an amount of unused buffer space;
   determining, for each queue, the queue dynamic threshold so as to define an upper limit for queue occupancy for the queue based on an amount of unused buffer space available to the given pool; and
   determining the pool dynamic threshold for PDs so as to define a maximum number of PDs available to the given pool that is based on a number of unused PDs.

3. The method of claim 2, wherein:
   the determining if there is unused buffer space available for packets in the given pool includes determining that there is unused buffer space available if an occupancy of the given pool is less than the pool dynamic threshold;
   the determining, for each queue, if there is unused buffer space available for packets in that queue includes determining that there is unused buffer space available if an occupancy of the queue is less than the queue dynamic threshold;
   the determining if there are unused PDs available to the given pool includes determining that there are unused PDs available if a number of PDs used by the given pool is less than the pool dynamic threshold for PDs; and
   determining, for each queue, if there are unused PDs available for the queue includes determining that there are unused PDs available for the queue if a number of PDs used by the queue is less than the queue dynamic threshold for PDs.

4. The method of claim 2, wherein:
   the determining the pool dynamic threshold includes multiplying the amount of unused buffer space by a pool parameter; and
   the determining the pool dynamic threshold for PDs includes multiplying the number of unused PDs by a pool parameter for PDs.

5. The method of claim 2, wherein:
the determining, for each queue, the queue dynamic threshold includes multiplying the amount of unused buffer space available to the given pool by a queue parameter; and
the determining, for each queue, the queue dynamic threshold for PDs includes multiplying the number of unused PDs available to the given pool by a queue parameter for PDs.

6. The method of claim 5, wherein the determining the queue dynamic threshold for PDs further includes:
determining the queue dynamic threshold for PDs so that the queue dynamic threshold for PDs is proportional to a product of the ratio, the amount of unused buffer space available to the given pool, and the queue parameter for PDs.

7. The method of claim 5, wherein the determining the queue dynamic threshold further includes, for the queue for which the packet is destined:
reducing the determined queue dynamic threshold by a random amount.

8. The method of claim 1, wherein each of the multiple pools is associated with a corresponding one of different network traffic classes.

9. An apparatus comprising:
network ports to receive and send network packets from and to a network; and
a controller coupled to the network ports, the controller including a buffer having buffer space to store network packets, and a store of packet descriptors (PDs) that are used to link the network packets into queues that feed the packets to output ports of the apparatus, wherein the buffer space is shared among multiple traffic pools and the PDs are shared among the multiple traffic pools, the controller configured to:
receive a multicast packet destined for multiple queues associated with a given pool;
determine if there is unused buffer space available for packets in the given pool based on a pool dynamic threshold;
determine, for each queue, if there is unused buffer space available for packets in that queue based on a queue dynamic threshold for that queue;
determine if there are unused PDs available to the given pool based on a pool dynamic threshold for PDs;
determine, for each queue, a queue dynamic threshold for PDs so as to define a maximum number of PDs available to the queue that is based on a number of unused PDs available to the given pool, wherein the queue dynamic threshold for PDs is determined based on an average fanout of packets in the given pool, the average fanout being a ratio of (i) a number of PDs used by the given pool, and (ii) a pool occupancy for the given pool;
determine, for each queue, if there are unused PDs available for that queue based on the queue dynamic threshold for PDs for that queue; and
admit the packet only into the queues for which all of the determining operations pass.

10. The apparatus of claim 9, wherein the controller is further configured to:
determine the pool dynamic threshold so as to define an upper limit for pool occupancy for the given pool that is based on an amount of unused buffer space;
determine, for each queue, the queue dynamic threshold so as to define an upper limit for queue occupancy for the queue based on an amount of unused buffer space available to the given pool; and
determine the pool dynamic threshold for PDs so as to define a maximum number of PDs available to the given pool that is based on a number of unused PDs.

11. The apparatus of claim 10, wherein the controller is configured to:
determine if there is unused buffer space available for packets in the given pool by determining that there is unused buffer space available if an occupancy of the given pool is less than the pool dynamic threshold;
determine, for each queue, if there is unused buffer space available for packets in that queue by determining that there is unused buffer space available if an occupancy of the queue is less than the queue dynamic threshold;
determine if there are unused PDs available to the given pool by determining that there are unused PDs available if a number of PDs used by the given pool is less than the pool dynamic threshold for PDs; and
determine, for each queue, if there are unused PDs available for the queue by determining that there are unused PDs available for the queue if a number of PDs used by the queue is less than the queue dynamic threshold for PDs.

12. The apparatus of claim 10, wherein the controller is configured to:
determine the pool dynamic threshold by multiplying the amount of unused buffer space by a pool parameter; and
determine the pool dynamic threshold for PDs by multiplying the number of unused PDs by a pool parameter for PDs.

13. The apparatus of claim 10, wherein the controller is configured to:
determine, for each queue, the queue dynamic threshold includes by multiplying the amount of unused buffer space available to the given pool by a queue parameter; and
determine, for each queue, the queue dynamic threshold for PDs by multiplying the number of unused PDs available to the given pool by a queue parameter for PDs.

14. The apparatus of claim 13, wherein the controller is further configured to determine the queue dynamic threshold for PDs by:
determining the queue dynamic threshold for PDs so that the queue dynamic threshold for PDs is proportional to a product of the ratio, the amount of unused buffer space available to the given pool, and the queue parameter for PDs.

15. The apparatus of claim 13, wherein the controller is further configured to determine the queue dynamic threshold by, for the queue for which the packet is destined:
reducing the determined queue dynamic threshold by a random amount.

16. The apparatus of claim 9, wherein each of the multiple pools is associated with a corresponding one of different network traffic classes.

17. A non-transitory computer readable storage media encoded with instructions that, when executed by a controller of a network device that includes a buffer having buffer space to store network packets, and a store of packet descriptors (PDs) that are used to link the network packets into queues that feed the packets to output ports of the network device, wherein the buffer space is shared among multiple traffic pools and the PDs are shared among the multiple traffic pools, cause the controller to:

receive a multicast packet destined for multiple queues associated with a given pool;
determine if there is unused buffer space available for packets in the given pool based on a pool dynamic threshold;
determine, for each queue, if there is unused buffer space available for packets in that queue based on a queue dynamic threshold for that queue;
determine if there are unused PDs available to the given pool based on a pool dynamic threshold for PDs;
determine, for each queue, a queue dynamic threshold for PDs so as to define a maximum number of PDs available to the queue that is based on a number of unused PDs available to the given pool, wherein the queue dynamic threshold for PDs is determined based on an average fanout of packets in the given pool, the average fanout being a ratio of (i) a number of PDs used by the given pool, and (ii) a pool occupancy for the given pool;
determine, for each queue, if there are unused PDs available for that queue based on the queue dynamic threshold for PDs for that queue; and
admit the packet only into the queues for which all of the determining operations pass.

18. The computer readable storage media of claim 17, further comprising instructions to cause the controller to:
determine the pool dynamic threshold so as to define an upper limit for pool occupancy for the given pool that is based on an amount of unused buffer space;
determine, for each queue, the queue dynamic threshold so as to define an upper limit for queue occupancy for the queue based on an amount of unused buffer space available to the given pool; and
determine the pool dynamic threshold for PDs so as to define a maximum number of PDs available to the given pool that is based on a number of unused PDs.

19. The computer readable storage media of claim 18, wherein the instructions include instructions to cause the processor:
determine if there is unused buffer space available for packets in the given pool by determining that there is unused buffer space available if an occupancy of the given pool is less than the pool dynamic threshold;
determine, for each queue, if there is unused buffer space available for packets in that queue by determining that there is unused buffer space available if an occupancy of the queue is less than the queue dynamic threshold;
determine if there are unused PDs available to the given pool by determining that there are unused PDs available if a number of PDs used by the given pool is less than the pool dynamic threshold for PDs; and
determine, for each queue, if there are unused PDs available for the queue by determining that there are unused PDs available for the queue if a number of PDs used by the queue is less than the queue dynamic threshold for PDs.

20. The computer readable storage media of claim 18, wherein the instructions include instructions to cause the processor to:
determine the pool dynamic threshold by multiplying the amount of unused buffer space by a pool parameter; and
determine the pool dynamic threshold for PDs by multiplying the number of unused PDs by a pool parameter for PDs.

\* \* \* \* \*